May 27, 1969  F. ENGEL ET AL  3,446,786
POLYMERIZATION TECHNIQUE
Filed March 8, 1965
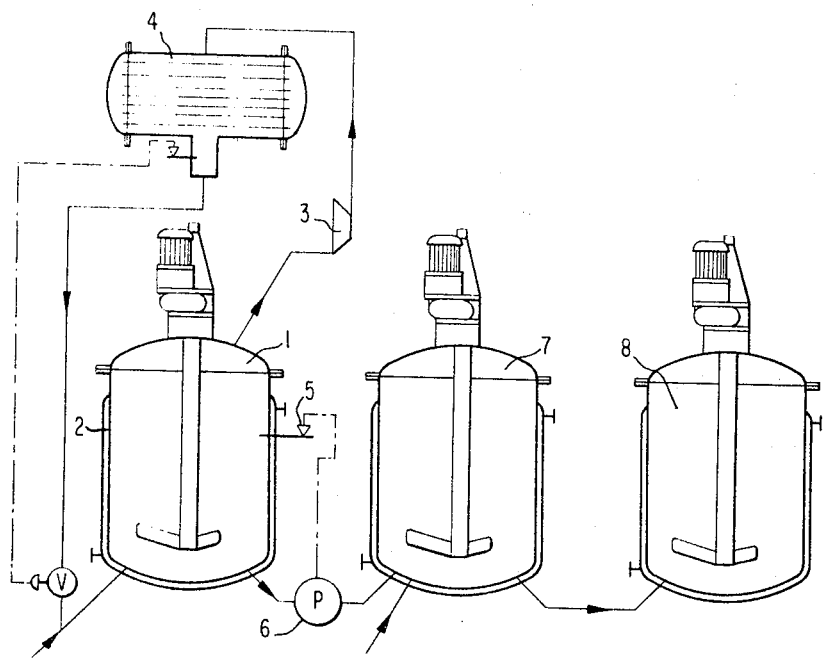
INVENTORS
FREDERICO ENGEL
GÜNTER BECKMANN
BY *I. Wm. Millen*
ATTORNEY United States Patent Office 3,446,786
Patented May 27, 1969

3,446,786
POLYMERIZATION TECHNIQUE
Frederico Engel and Günter Beckmann, Marl, Germany, assignors to Chemische Werke Huls, A.G., Marl, Germany
Filed Mar. 8, 1965, Ser. No. 437,856
Claims priority, application Germany, Mar. 10, 1964, C 32,368
Int. Cl. C08f 1/08, 1/06
U.S. Cl. 260—94.2                8 Claims

ABSTRACT OF THE DISCLOSURE

A process for providing for the removal of heat of polymerization from a subsequent step of solution-polymerizing olefins in hydrocarbon solvents, which process comprises the steps of:

(a) Cooling under agitation a solution of a hydrocarbon solvent containing 3 to 10 percent by weight based on the total solution of a dissolved polymerizable olefin of three to eleven carbon atoms, to a temperature of 3 to 7 centigrade degrees below the freezing point of the solvent, said solvent having a freezing point between +14° C. and −4° C. to form flowable slush containing from 10% to 70% by weight of solid frozen solvent, said solid frozen solvent generally having a particle size of less than 4 mm., preferably 10–1,000 microns, and (b) Passing the resultant slush to a polymerization zone.

---

This invention relaes to exothermic solution-polymerization processes, and in particular to a method of dissipating the heat of polymerization during the large-scale production of polyolefins.

In production-scale solution-polymerization processes, there is a problem in transmitting the heat of polymerization away from the reaction mass. Such processes are usually conducted in jacketed vessels and, as the polymerization proceeds, a layer of polymer builds up on the heat transfer surface of the jacket, thereby substantially reducing the rate of heat transfer. In many cases, due to this lower rate of heat transfer, the optimum rate of polymerization cannot be attained even in the presence of catalysts. Consequently, it is necessary to either conduct the reaction in substantially smaller vessels having a higher ratio of heat transfer area to volume, or to employ an alternative method for removing the heat.

Among the various known techniques for removing the heat of polymerization are the use of a reflux condenser and the cooling of starting and/or final liquid products.

Another known way of removing the heat of polymerization, particularly adapted to olefin polymerization in toluene, is to add pure frozen benzene. The thus-cooled liquid toluene-benzene mixture is then used for the polymerization, this mixture absorbing part of the polymerization heat by being heated to the polymerization temperature. This technique is, however, encumbered by major disadvantages. On the one hand, it is necessary to use two different solvents, thereby entailing a more complicated solvent recovery system which renders the process substantially more expensive; and, on the other hand, the pure frozen benzene is present in the form of coarse crystals which firmly adhere to the walls of the vessel, as well as the conduits leading thereto. It is obvious, therefore, that such a process is hardly amenable to continuous operation.

A principal object of this invention, therefore, is to provide an improved process for removing heat from a polymerization reaction.

Upon further study of the specification and claims, other objects and advantages of the present invention will become apparent.

To attain the objects of this invention, there is provided a polymerization process which comprises cooling a solution of a monomer in a solvent to form a flowable slush containing from 10% to 70% by weight of solid frozen solvent.

In general, the particle size of the frozen solvent should be less than 4 mm. preferably in the range of 10 to 1000 micron.

The process of this invention is particularly adaptable to hydrocarbon solvents. In this case, a solution is first formed of a solvent and 3 to 10, preferably 5 to 7 percent by weight of one or more polymerizable olefins having 3 to 12 carbon atoms, the percentages being based on the total solution. The solvent must have a freezing point in the range of between +14° and −4° C. The solution is then cooled to a temperature between 3° and 7° C. below the freezing point of the particular solvent used, and the thus-produced suspension is subsequently subjected to polymerization.

Olefins to be employed in this connection can be, for example, mono- and di-unsaturated compounds of 3 to 12 carbon atoms, such as propylene, butylene, 1,3-butadiene, 1,3-pentadiene, 1,3-hexadiene, pentylene, hexylene as well as styrene and its alkyl derivatives, the alkyl group having 1 to 4 C-atoms.

Solvents are preferably liquid hydrocarbons, such as for example, benzene, 1,2,3,4-tetramethyl benzene, p-xylene, and cyclohexane, said solvents having a freezing point between +14° and −4° C. Other solvents having freezing points in the same range can be selected from handbooks and the like.

The solution-polymerization step itself can be conducted in a conventional manner, for example, by the low-pressure process with Ziegler-type or lithium catalysts.

The single figure of the drawing is a schematic flowsheet of a preferred embodiment of this invention.

In operation, prior to the polymerization step, the solvent containing the dissolved olefin is cooled, in an agitated vessel, by means of brine flowing through either the vessel jacket or through a cooling coil. The elimination of heat can also be accomplished by direct evaporation of the dissolved olefin, subsequent compression, condensation, and re-introduction of the condensed olefin, i.e., according to the principle of a simple refrigeration cycle. To the resultant viscous suspension of partly frozen, partly non-frozen solvent and the olefin to be polymerized, there is added the additional quantity of olefin which is required for the polymerization step. Other necessary components are also added, and the mixture is then introduced into the polymerization zone.

A most important advantage of this process resides in the fact that when cooling a mixture of, for example, 95 percent by weight of benzene and 5 percent by weight of butadiene-(1,3), there is obtained at 0° C. a pumpable and stirrable finely crystalline paste of solid benzene. Not only is the temperature level required for freezing easily obtainable by an inexpensive conventional refrigerating technique, but the resultant paste containing up to 70 percent by weight of frozen benzene does not, for all practical purposes, adhere to either the heat exchange surfaces or the inlet and outlet conduits. When this pasty mixture is introduced into the polymerization kettle, the benzene, while being melted and heated to the polymerization temperature, consumes the predominant portion of the heat of polymerization without the quality of the polymer forming in the kettle, or the process of polymerization itself, being disadvantageously influenced in any way.

Referring now to the appended drawing, the illustrated apparatus is suitable for conducting the preceding process in a continuous manner. A solution of solvent and polymer, e.g. benzene containing 5% butadiene-(1,3) is introduced into the agitated vessel 1. The cooling of the kettle contents is accomplished either by means of a refrigerant, such as brine cooled to −5° C., which flows through the kettle jacket 2, or preferably by evaporating the 1,3-butadiene contained in the benzene at a pressure of between 0.6 and 1 atmosphere absolute, the evaporated 1,3-butadiene being compressed in compressor 3, condensed in condenser 4, and again recycled in liquid state to the lower portion of the agitated vessel 1. The mixture containing frozen benzene forms in the agitated vessel 1, no solid benzene being deposited at the walls.

In response to liquid level control 5, the mixture is pumped by means of a rotary pump 6 into the first polymerization kettle 7 which is under a pressure of 3 atmospheres gage and is completely filled. The remainder of the polymerization recipe is also introduced into this first polymerization kettle 7.

It is advantageous to keep the polymerization temperature in the first polymerization kettle 7 lower than in the second polymerization kettle 8, because in this case there will still be some cooling effect left for the second polymerization kettle for compensation of the heat of polymerization. Because of the initially steep ascent of the reaction curve, the predominant portion of the polymerization heat is developed in the first polymerization kettle. By operating according to the process of this invention, only a small portion of the heat which develops has to be removed through the walls of the polymerization kettle.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever. In particular, the following example shows the large portion of the polymerization heat which can be removed by means of melting and heating the solvent.

Example 1

10 tons per hour of a 5 percent by weight solution of butadiene-(1,3) in benzene are introduced into a first agitated vessel of a series of vessels constructed according to the attached drawing. This vessel has a capacity of 15 m.$^3$ and an agitator speed in the range of 50 to 70 revolutions per minute. By evaporation at 0.6 atmosphere absolute, compression, condensation, and recycling of the butadiene-(1,3), heat is removed from the agitated vessel until about 70% of the benzene contained therein is frozen. There is thus obtained a mixture which can be pumped and stirred, and this mixture is pumped into the first polymerization kettle. The remaining additives, such as catalysts, polymerization control agents, and additional butadiene are introduced directly into the first polymerization kettle. The sum of both butadiene quantities amounts to 14 percent by weight of the total amount of benzene and butadiene.

For melting the frozen benzene and heating the melt to the polymerization temperature of 15° C., 265,000 kcal. per hour are consumed in the first polymerization kettle. The product from the first kettle is then passed to the second polymerization kettle, which is operated at 30° C. To compensate for this rise of 15 degrees, 65,000 kcal. of the heat of polymerization in the second kettle is beneficially consumed.

The heat of polymerization in the first polymerization kettle amounts, with 65% conversion, to 302,000 kcal. per hour, and in the second polymerization kettle, with a further 20% conversion, to 93,000 kcal. per hour. The energy of agitation supplied to the kettle is, per kettle, approximately 30,000 kcal. per hour.

Thus, in the first polymerization kettle, a total of 332,000 kcal. per hour is produced, of which only 332,000 minus 265,000=67,000 kcal. per hour have to be eliminated through the kettle wall. In the second polymerization kettle, a total of 123,000 kcal. per hour is produced, of which only 123,000 minus 65,000=58,000 kcal. per hour have to be eliminated through the kettle wall.

The particle size of the frozen benzene in the slush is smaller than 1000 microns. The viscosity of the slush was estimated to be in the range of 10,000 to 40,000 cp. i.e. in a range that still permits mixing and pumping. Accurate measurement of the viscosity was impossible as the process of sampling and filing the viscosimeter and the friction heat of the viscosimeter itself would cause melting of a part of the frozen solvent and thus falsify the measurement. Apart from this, the slush very probably is a non-newtonian liquid in respect to viscosity. For smaller contents of frozen benzene, we observed a rapid sedimentation of the ice crystals in the slush, when the agitation was stopped.

Example 2

A mixture of 55.1 kg. per hour of benzene and 2.9 kg. per hour of propylene is introduced into an agitated vessel of 120 liters capacity and 1.1 m.$^2$ refrigerated wall area. The temperature of the refrigerant in the jacket is −3° C.; the temperature in the interior of the agitated vessel is +2° C. The agitator is frame-shaped and rotates at 40 r.p.m. The mixture of benzene and propylene is withdrawn from the bottom of the agitated vessel. 48% of the benzene fraction are frozen, but the slushly mixture is still capable of flowing and can still be pumped. The ice crystals are fine-grained, the particle size being less than 1 mm.

The slush is then conducted into a polymerization reactor of 22 liters capacity, where there are introduced into the reactor 1.5 kg. per hour of ethylene gas, catalysts, and regulating substances at a temperature of 20° C. The reactor has a refrigeration area of 0.3 m.$^2$ and is cooled by means of brine at −3° C. The temperature in the reaction chamber is 20° C. By a polymerization reaction, 1.3 kg. per hour of the supplied propylene and 1.3 kg. per hour of the supplied ethylene react to form 2.6 kg. per hour of ethylene-propylene-caoutchouc. The unreacted gaseous portion is withdrawn by means of a pipeline in the reactor lid.

The heat balance calculation of the polymerization process demonstrates the favourable influence of providing benzene in ice form:

HEAT SUPPLIED

| | Kcal./h. |
|---|---|
| Reaction heat: 2.6 kg./h.·680 kcal./kg. | 1,770 |
| Agitating energy: 1.1 kw.·860 kcal./kw. | 950 |
| Total heat supplied | 2,720 |

HEAT REMOVED

| | |
|---|---|
| Heat consumed by melting benzene: 0.48·55.1 kg/h.·30.5 kcal./kg. | 800 |
| Energy for heating the mixture of benzene and propylene from +2° C. to +20° C.: 18° C.·0.405 kcal./kg. ° C.·(55.1+2.9) kg./h. | 425 |
| Heat consumed by evaporation of waste gas propylene: 105 kcal./kg.·1.6 kg./h. | 170 |
| Energy absorbed by the refrigerating wall: 0.3 m.$^2$·23° C.·182 kcal./m.$^2$ h.° C. | 1,325 |
| Total removed energy | 2,720 |

The heat transmission value at the refrigeration wall of the polymerization reactor is, in this case, with full utilization of the temperature gradient at the refrigeration wall, 182 kcal./m.$^2$ h.° C. If the benzene had been introduced at the same temperature of +2° C., however not in slush form, the heat transmission value of the polymerization reactor would have had to be 293 kcal./m².h° C. in order to balance the above calculations. Such a high value, however, can hardly be accomplished in practice and can hardly be maintained over a longer period of time, as wall deposits at the wall of the polymerization reactor strongly inhibit the heat transmission.

The preceding examples can be repeated with similar success by substituting other solvents, polymers and operating conditions, as specifically and generically disclosed herein.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An exothermic solution-polymerization process comprising:
    (a) cooling under agitation a soluiton of a hydrocarbon solvent containing 3–10% by weight based on the total solution of a dissolved polymerizable olefin of 3–12 carbon atoms, to a temperature of 3–7 degrees centigrade below the freezing point of the solvent, said solvent having a freezing point between +14° C. and −4° C., forming a flowable slush containing from 10% to 70% by weight of frozen solvent;
    (b) passing the flowable slush to a polymerization zone;
    (c) advancing the flowable slush in the polymerization zone to the polymerization temperature; and
    (d) polymerizing the olefin.

2. The process of claim 1, wherein the solvent is selected from the group consisting of benzene, 1,2,3,4-tetramethyl benzene, p-xylene and cyclohexane.

3. The process of claim 1, wherein the polymerizable olefin is selected from the group consisting of propylene, butylene, 1,3-butadiene, 1,3-pentadiene, 1,3-hexadiene, pentylene, hexylene, styrene and alkyl derivatives of styrene wherein the alkyl group has 1–4 carbon atoms.

4. The process of claim 1, wherein the solvent is selected from the group consisting of benzene, 1,2,3,4-tetramethyl benzene, p-xylene and cyclohexane, and the polymerizable olefin is selected from the group consisting of propylene, butylene, 1,3-butadiene, 1,3-pentadiene, 1,3-hexadiene, pentylene, hexylene, styrene and alkyl derivatives of styrene wherein the alkyl group has 1–4 carbon atoms.

5. The process of claim 4, wherein the olefin is 1,3-butadiene and the solvent is benzene.

6. The process of claim 1, wherein the solution is cooled by the steps of: directly evaporating said olefin from said solution; compressing said olefin; condensing said olefin; and recycling the condensed olefin to said solution.

7. The process as defined by claim 1, wherein said frozen solvent has a particle size of less than 4 mm.

8. The process as defined by claim 7, wherein said frozen solvent has a particle size of 10–1000 microns.

References Cited

UNITED STATES PATENTS

| | | | |
|---|---|---|---|
| 2,550,695 | 5/1951 | Hillyer et al. | 260—94.2 |
| 2,612,493 | 9/1952 | Sparks et al. | 260—94.2 |
| 2,624,726 | 1/1953 | Serniuk | 260—94.2 |
| 2,979,509 | 4/1961 | Warner | 260—94.2 |
| 3,182,050 | 5/1965 | Irvin | 260—94.2 |

HARRY WONG, JR., *Primary Examiner.*

U.S. Cl. X.R.

260—93.5, 94.3, 94.9